Oct. 27, 1931.  L. B. BRIDGES  1,828,856
SCREW THREAD COUPLED MEMBER
Filed Jan. 18, 1928  2 Sheets-Sheet 1
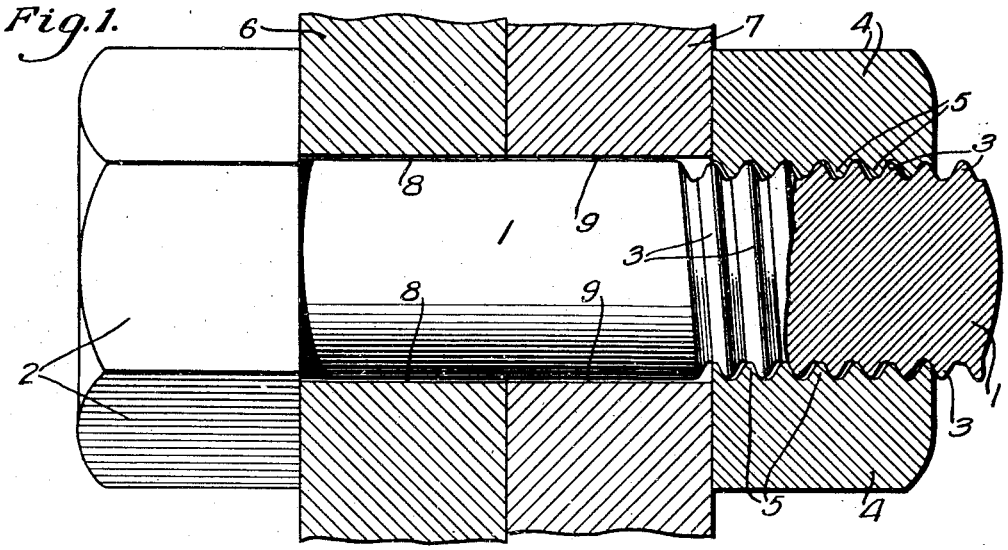
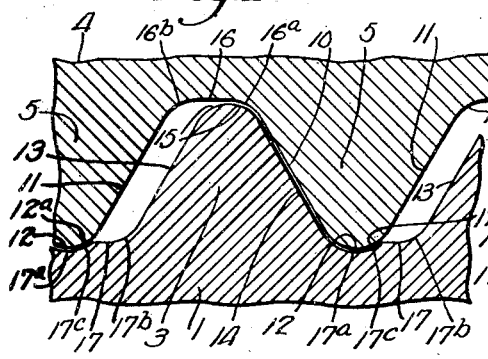
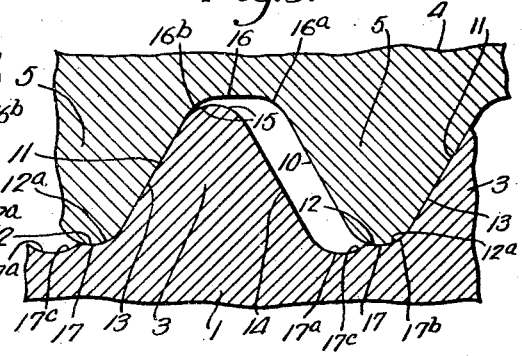
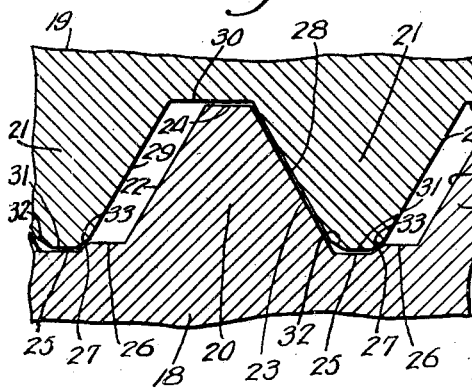
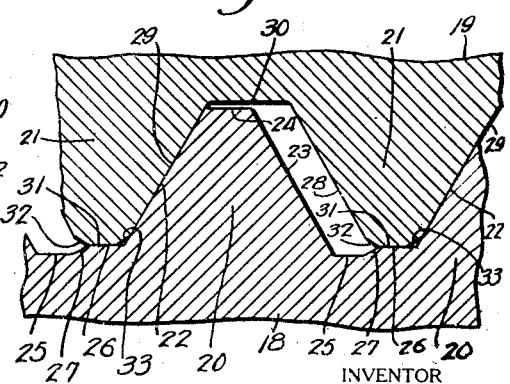
INVENTOR
L. B. Bridges
BY
ATTORNEYS Oct. 27, 1931.  L. B. BRIDGES  1,828,856
SCREW THREAD COUPLED MEMBER
Filed Jan. 18, 1928  2 Sheets-Sheet 2
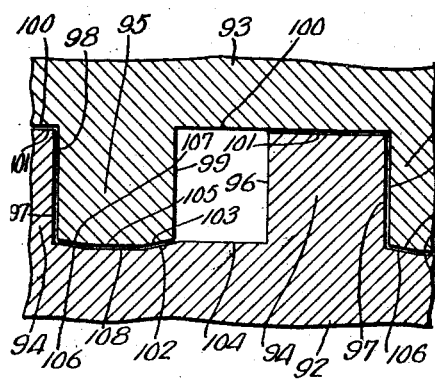
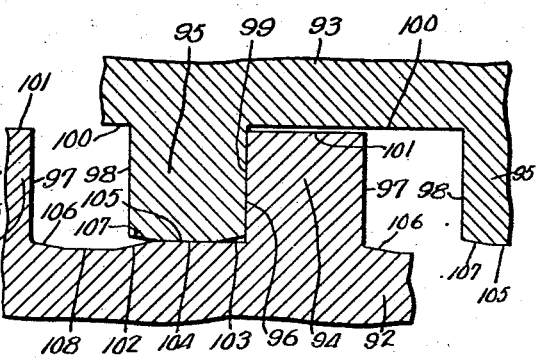
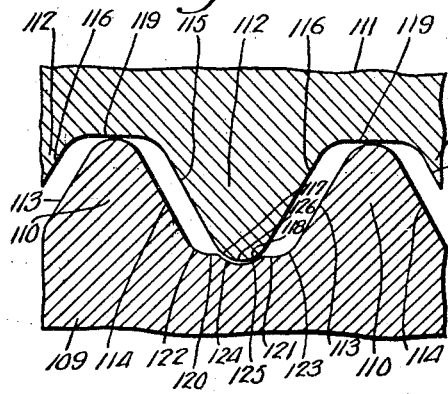
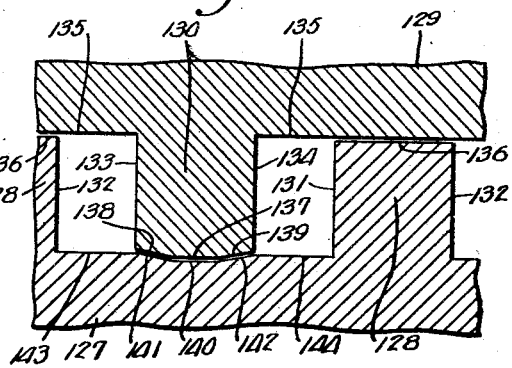
INVENTOR
L. B. Bridges
BY
ATTORNEYS Patented Oct. 27, 1931

1,828,856

UNITED STATES PATENT OFFICE

LEWIS B. BRIDGES, OF BROOKLYN, NEW YORK, ASSIGNOR, BY MESNE ASSIGNMENTS, TO DARDELET THREADLOCK CORPORATION, OF NEW YORK, N. Y., A CORPORATION OF DELAWARE

SCREW-THREAD COUPLED MEMBER

Application filed January 18, 1928. Serial No. 247,594.

This invention relates to improvements in screw-thread-coupled members, such as a bolt and nut.

The general object of the invention is to provide screw threaded members so constructed that coupled male and female threads of two members may be effectively locked together against accidental relative turning movement without employing auxiliary locking devices. More particularly, the general purpose of the invention is to provide an efficient self-locking screw thread connection for two members such, for example, as a bolt and nut, wherein the coupling threads are formed for limited crosswise displacement while interfitted and for effecting a tight grip between the crest of one thread and the root of the other and release of said grip as incidents of such crosswise displacement of the threads in screwing the members together and apart. The invention also makes provision for the attainment in a screw thread connection of this kind of other important advantages and results, including (1) effecting locking and unlocking by crosswise and radial displacement of coactive locking surfaces that are out of concentric relation while the coupled threads are unlocked; (2) effecting the locking by a grip between surfaces of the coupled threads that are parallel with the thread axis throughout the area of contact therebetween; (3) capability of screwing at least one of the threaded members either end first on to the other and, particularly, reversibility of the nut in a nut and bolt fastening; (4) guiding of one thread by the other to advance at the pitch rate in unlocking relation without contact between the gripping surfaces; (5) permissibility of relatively large tolerances in manufacture of the threads; and (6) effective thread locking and unlocking actions within a relatively small limit of crosswise thread displacement.

Several constructions within the scope of the invention have been illustrated. While a nut and bolt assembly has been shown, and, for convenience and brevity, the male and female screw elements of the various constructions shown will be described as bolts and nuts, respectively, it will be obvious that the invention is not limited either to the forms of threading shown or to the use thereof in connection with bolts and nuts, or to coupled male and female screw elements detachable in the common sense of the word, i. e. merely by relative rotation of the members, but is applicable to various constructions, devices and assemblies of elements wherein two elements have a screw thread connection for effecting relative movement between the elements axially of said connection upon a relative turning movement between the elements. It will be obvious also that the invention may be employed in constructions wherein the locking displacement effecting force may be exerted as a pull as well as in constructions where this force is exerted as a push.

In the drawings:

Fig. 1 is a view partly in section showing a bolt and nut fastening with the parts of the fastening locked in work-clamping position against accidental unscrewing, the bolt and nut or male and female screw members having threads of the form shown more clearly in Figs. 2 and 3;

Figs. 2 and 3 fragmentary sectional views of the male and female screw members, the coupled members being shown in free-turning and locked relation, respectively, in the two views;

Figs. 4 to 7, inclusive, fragmentary views of other constructions of coupled members within the invention, the coupled members being in free-turning relation in the even numbered views and in locked relation in the odd numbered views, the two views of each modified construction being arranged side by side;

Fig. 8 a view of a construction somewhat similar to that shown in Figs. 2 and 3, with the coupled members in free-turning relation and the threads formed for displacement into locked relation in either direction from the position shown; and Fig. 9 a view of a construction somewhat similar to that shown in Figs. 6 and 7, with the coupled members in free-turning relation and capable of locking upon displacement in either direction.

For convenience, the male and female screw elements in the several constructions will be described as bolts and nuts, respectively, the head of the bolt being assumed to be at the left as in Fig. 1 in each case.

In the construction shown in Figs. 1, 2 and 3, the bolt shank 1 is provided at its left hand end with a bolt head 2 and at its right hand end is formed with a male screw thread 3. A nut 4 having a female screw thread 5 is screwed onto the threaded portion of the bolt shank. A pair of work pieces 6 and 7 are clamped tightly between the bolt head and the nut, the shank of the bolt passing through apertures 8 and 9 in members 6 and 7, and the nut thread 5 being displaced (by the reaction of the work incident to the tightening up of the nut) relatively to the bolt thread 3 to the limit of its crosswise displacement toward the right or away from the bolt head as more clearly shown in Fig. 3.

The rib portions of the threads 3 and 5 each have a cross-sectional contour generally similar to that of the British standard thread affording two helicoidal side surface portions converging toward the top surface of the thread rib which is slightly rounded and presents a convex helicoidal thread surface toward the bottom of the thread groove of the other thread, the side surface portions each making a large angle with the axial line of the threads. The opposed coactive side surface portions of the male and female threads are parallel with each other. Side surface portions 10 and 11 of nut thread 5 form helicoidal abutments connected by the convex top portion of the thread rib, and side surface portions 13 and 14 of the bolt thread 3 form helicoidal abutments connected at the top of the thread rib by the convex surface portion 15.

The bottom of the nut thread groove comprises an intermediate surface portion 16 parallel with the axial line of the threads and merged with side surface portions 10 and 11 by transversely curved outer surface portions 16ª and 16ᵇ conforming to the curvature of the two longitudinal halves of the top of the bolt thread rib. The spacing between the convolutions of each rib is appreciably greater than is necessary for conveniently receiving the coacting rib, thereby affording a material extent of crosswise displacement between the threads while coupled.

The bottom of the groove of the bolt thread may be regarded as having the same cross sectional outline as that of the nut thread except that it would be too shallow to receive the nut thread rib without deformation of the threads but for the presence of a shallow channel (of concave arcuate outline throughout) formed therein along the left hand side thereof. That is to say, the bottom of the bolt thread groove comprises a concave surface portion 17ª conforming with curvature of the top of the nut thread rib and merging at its left hand edge with side surface portion 14 of the bolt thread rib and merging at its right hand edge with the left hand edge of locking surface portion 17 of the bolt thread groove bottom. Surface portion 17 lies parallel with the axial line of the threads and is merged with side surface portion 13 of the bolt thread rib by a surface portion 17ᵇ of the bottom of the thread groove curved transversely to conform with the curvature of the right hand section of the top of the nut thread rib.

The several surface portions are all helicoidal and of the same pitch, extending from end to end of the threads which are of equal and constant pitch. The diameter of surface portion 17 is slightly greater than the internal diameter of the nut thread rib at the highest portion or apex line 12 of the nut thread rib, so that the rounded top of the nut thread rib projects slightly into the groove formed by surface portion 17ª in the position of the parts shown in Fig. 2.

The threads are preferably formed to provide a slight normal clearance between the same from the medial line of surface 15 to the left hand edge of surface 17 of the bolt thread to facilitate starting of the nut onto the bolt and enable the nut to be easily screwed along the bolt in either direction when the threads are in free turning relation. The normal clearance between surfaces 11 and 13 is greater than the clearance just described and sufficient to enable the threads to be displaced crosswise far enough for the apex or highest portion 12 of the nut thread rib to be seated on surface 17, as shown in Fig. 3. The helical medial surface portion or apex 12 of the top of the nut thread rib therefore forms a thread-locking surface portion cooperative with thread locking surface portion 17, which latter surface portion has a slightly greater radial displacement from the axial line of the threads than the locking surface portion 12 and is displaced crosswise of the threads out of concentric interfitting relation with said apex portion of the rib top when the parts are in the position shown in Fig. 2. Intermediate these two cooperative thread locking surface portions are located in laterally opposed relation the two right-hand longitudinal half-sections of the nut-rib-top and groove 17ª which afford two coactive helicoidal cam surface portions 12ª and 17ᶜ sloping slightly transversely thereof in the same direction toward the axial line of the threads and overlapping to a slight extent radially of the bolt and nut.

The helicoidal surface portions 12ª and 17ᶜ are coactive to advance the nut onto the bolt or toward the left at the pitch rate for initial screwing on of the nut, but, upon development of resistance to such pitch rate advance by reaction of the work, continued turning of the nut in the same direction causes these initially coactive surface portions to be displaced across each other, and act as cam surfaces during such crossing, to effect sufficient relative radial displacement (by temporary elastic deformation of the material) between the cooperative thread locking surfaces 12 and 17 to permit said locking surfaces to be displaced crosswise into concentric interfitting relation as the screwing up of the nut against the work continues. When the thread locking surface portions are thus displaced into self-holding relation, abutment surface portions 11 and 13 come into engagement and positively arrest the crosswise displacement. These surface portions 11 and 13 are at this time cooperative to take axial strains and are also cooperative, if necessary or desirable, as final screwing surface portions to effect further advance of the nut against the work at the pitch rate for securing tight clamping.

It will be observed that the locking surface portions are engaged one within the other and hug together tightly under the elastic stress generated in the material by the relative radial displacement of the locking surfaces effected by the crossing of the cam surface portions which temporarily equalize the normally differential radial displacement of the two locking surface portions from the axial line of the threads. This elastic holding force is sufficient to hold the smooth concentrically interfitted helicoidal locking surface portions in such tight engagement that accidental relative turning movement between the nut and bolt is prevented, while at the same time, the nut may be screwed farther onto the bolt, or readily released to free-turning relation and unscrewed, by means of a wrench.

It will be noted that the distance from the apex line or narrow locking surface 12 of the nut thread rib to the left hand edge of locking surface portion 17 is short as compared with the size of the thread so that the extent of crosswise displacement necessary to effect locking of the threads is slight. Surface portions 10 and 14 coact to positively arrest crosswise thread displacement in the direction effecting unlocking of the threads and are coactive to back the nut off the bolt.

It will be obvious that the bottom of the nut thread groove and the top of the bolt thread rib need not necessarily have the form shown but may have any contour not interfering with the described action of the remaining surface portions of the threads, for example, a straight line as in the construction shown in Figs. 4 and 5. Nor need groove 17 be curved to correspond with the curvature of rib top 12. For example, the groove may be formed as in Figs. 4 and 5.

In the construction shown in Figs. 4 and 5 the thread ribs have the general form of the ribs of the U. S. standard thread. The bolt shank 18 and the nut 19 are formed with male and female screw threads 20 and 21, respectively, these threads being of equal and constant pitch. Thread 20 is formed with oppositely inclined abutment surface portions 22 and 23, a rib top surface portion 24 parallel with the axial line of the thread, and a thread groove bottom comprising two transversely and slightly radially displaced surface portions 25 and 26 parallel with the axial line of the threads and connected by a narrow surface portion 27 which makes an angle with the axial line of the thread, sloping radially outward and toward the right from surface 25 to surface 26.

Thread 21 is formed with oppositely inclined abutment surface portions 28 and 29 parallel with and opposed to abutment surface portions 23 and 22, respectively, of the bolt thread, connected by a thread groove bottom surface portion 30 lying parallel with the thread axis and also connected by a thread rib top comprising an intermediate surface portion 31 parallel with the axial line of the threads and two oppositely inclined narrow surface portions 32 and 33 which connect portion 31 with surface portions 28 and 29 respectively. Portions 31 and 26 form helicoidal thread locking surface portions parallel with the axial line of the threads, portion 26 having a slightly greater displacement radially from the axial line of the threads than portion 31 in the free-turning relation of the nut and bolt. Portions 27 and 33 form narrow helicoidal surface portions making an angle with the axial line of the thread to form opposed cam surfaces for effecting the relative radial displacement between surface portions 31 and 26 to enable surface 31 to embrace surface 26 under elastic stress, said surfaces 33 and 27 being also coactive to effect initial advance of the nut onto the bolt. There is the slight normal clearance between surfaces 24, 23, 25 and 27 of the bolt thread and surfaces 30, 28, 32, 31 and 33 of the nut thread, and the larger normal clearance between surfaces 29 and 22 for the same purpose as in the construction first described.

While it is not essential that the entire rib top to the left of surface 33 seat on surface 26 if said left hand part of the rib top be extended in a horizontal line to a junction with surface 28, I prefer that the entire width of nut-thread locking surface which is parallel with surface 26 should be seated on the latter surface when surface portions 29 and 22 abut. The purpose of the beveled surface portion 32 of the nut thread rib top is to reduce the necessary crosswise displacement for effecting this full widthwise engagement of parallel locking surfaces of the two threads. Surfaces 25 and 27 may be regarded as forming a helicoidal channel in the left hand side of the thread groove bottom of the bolt into which the top of the nut thread rib slightly projects and along which said rib top is adapted to freely travel when the nut and bolt are in free turning relation. Although a much broader bind of the nut thread on the bolt thread is secured in the construction shown in Figs. 4 and 5 than in that shown in Figs. 2 and 3 the extent of crosswise displacement is practically the same with threads of the same pitch and depth.

In Figs. 6 and 7 the bolt and nut are formed with square threads of equal and constant pitch with cam surface portions making a slight angle with the axial line of the threads. In this construction 92 is the bolt shank, 93 the nut, 94 and 95 the bolt and nut threads of equal and constant pitch, 96 and 97 the abutment surface portions of the bolt thread, 98 and 99 the abutment surface portions of the nut thread, 100 the bottom surface of the nut thread groove, 101 the top surface of the bolt thread rib, 102 and 103 the low angle cam surface portions of the bolt and nut threads, 104 and 105 the normally radially and crosswise displaced locking surface portions of the bolt and nut threads, and 106 and 107 parallel, normally opposed, low angle surface portions of the bolt and nut threads. The surface 107 reduces the width of the locking surface of the nut thread so that full overlapping of the locking surfaces may be obtained with a lesser crosswise displacement than would otherwise be necessary. The bolt thread surface 108 is the bolt thread groove bottom surface portion connected with the locking surface portion 104 by cam surface portion 102 and normally opposed to locking surface portion 105 of the nut thread.

In Fig. 8 there is shown in free-turning relation a bolt and nut with threads of the type shown in Figs. 1, 2 and 3 but adapted to be displaced in either direction into self-locking relation. That is this form of thread may be said to afford double or reversible action thread lock. The bolt shank 109 is formed with a male thread 110 and the nut 111 is formed with a female thread 112, these threads being of equal and constant pitch. The thread 110 is formed with oppositely inclined abutment surface portions 113 and 114 and the thread 112 with oppositely inclined abutment surface portions 115 and 116 all correlated to permit crosswise displacement of the threads in opposite directions from a free-turning relation into either of two different self-locked relations. The tops of the thread ribs are slightly convex, affording on the top of the nut thread rib two oppositely sloping cam surface portions 117 and 118 meeting at the apex line of the rib, the apex line of the rib forming a narrow helicoidal thread-locking surface portion 126 on the nut thread. The bottom of the nut thread groove is given a contour permitting crosswise displacement of the threads until arrested by the abutment surfaces which make large angles with the axial line of the threads. This contour corresponds with that shown in Figs. 2 and 3 except that the intermediate portion 119 of the bottom of the nut thread groove lying parallel with the thread axis is wider in the present construction. The bottom of the bolt thread groove comprises two thread locking surface portions 120 and 121 separated by a concave channel extending along the medial line of the bolt thread groove. The locking surface portions 120 and 121 are connected with the abutment surface portions 114 and 113, respectively, by surface portions 122 and 123 curved transversely to conform with the transverse curvature of cam surface portions 117 and 118. The opposite sides of the channel form low angle cam surface portions 124 and 125 on the bolt thread opposed to cam surface portions 117 and 118 of the nut thread. Surfaces 120 and 121 are parallel with the axial line of the threads and have a greater radial displacement from the axial line of the threads than the apex portion 126 (locking portion) of the nut thread rib. The rounded top of the nut thread rib projects slightly into and is adapted to freely travel along the channel in the bottom of the bolt thread groove in the free-turning relation of the parts, and is adapted to be forced onto one or the other of the locking surfaces 120 and 121 dependent upon the direction of the reaction force causing crosswise thread displacement.

In Fig. 9 is shown a square thread coupling capable of locking under crosswise-displacement-effecting reaction force exerted in either direction as in the construction shown in Fig. 8. The threads are very similar in outline to the construction shown in Figs. 6 and 7, the relative spacing of the ribs being increased to provide a second locking surface at the left of the channel in the bolt thread groove bottom and surfaces similar to surfaces 106 and 107 being employed as a second set of cam surfaces. In Fig. 9 the parts are in free-turning relation. The bolt shank 127 has a male thread 128 and the nut 129 has a female thread 130, these threads being of equal and constant pitch. The threads have abutment surfaces 131, 132, 133 and 134 perpendicular to the axial line of the threads and correlated for displacement of the threads in either direction into locking relation. The bottom 135 of the nut thread groove and the top 136 of the bolt thread rib are parallel with each other and the axial line of the threads. The top of the nut thread rib is formed with a medial locking surface portion 137 and two oppositely inclined cam surface portions 138 and 139. The bottom of the bolt thread groove comprises a surface portion 140 parallel with and normally opposed to surface portion 137 and connected by two oppositely inclined cam surface portions 141 and 142 with two locking surface portions 143 and 144. Surfaces 141 and 142 are normally opposed to and parallel with surfaces 138 and 139 respectively and form with surface 140 a medial channel in the bottom of the bolt thread groove into which the top of the nut thread rib normally slightly projects. Surface portions 143 and 144 are parallel with the axial line of the threads and have a greater radial displacement therefrom than surface 137.

The nut and bolt, or other male and female screw threaded members, are formed of material possessing great rigidity, i. e. highly resistant to change of shape, to adapt the parts to withstand substantial strains, and also possessing inherent elasticity, preferably being completely elastic over an appreciable range of deformation. For most purposes, and particularly for bolts and nuts, I prefer to form the parts of steel. The difference in the radial displacement from the axial line of the threads of the locking surfaces on the coupled members should be slight and not great enough to deform the material beyond its elastic limit.

It will be observed that, in the various thread connections shown, the nut thread is a symmetrical thread and that, even in the connections wherein the bolt thread is not symmetrical, the nut may be screwed on to the bolt either end first with equal facility and that the nut and bolt threads will lock with equal efficiency no matter which end of the nut faces the work.

It will be obvious that some of the novel concepts included within the scope of the invention may be employed without the others, and that the invention is not limited to the illustrative embodiments shown and described. For example, it will be apparent upon inverting the sheets of drawings that instead of the coactive locking surfaces being located at the high part of the thread rib of the female member and in the thread groove of the male member, this arrangement may be reversed.

What I claim is:

1. A self-locking fastening device of the bolt and nut type, comprising a bolt having a head at one end and an external screw thread of constant pitch with a root of greater diameter at the side of the thread which faces the bolt head than at the side facing the nut receiving end of the bolt, and a nut having a symmetrical internal screw thread of the same pitch as the external bolt thread, said external and internal threads having sufficient space between the convolutions thereof to permit substantial crosswise movement of the nut thread relatively to the bolt thread while interfitted therewith, and the minor diameter of the symmetrical internal thread of the nut being such that when the threads are interfitted the nut screws freely along the bolt with its thread at one limit of said crosswise movement of the nut thread and frictionally binds tightly about the root of the bolt thread at the opposite limit of said crosswise movement of the nut thread.

2. A self-locking fastening device of the bolt and nut type, comprising a bolt having a head and an external screw thread of constant pitch, and a nut having an internal symmetrical screw thread of the same pitch as the bolt thread, the threads having roots materially wider than the thread bases to permit substantial crosswise movement of the nut thread relatively to the bolt thread while interfitted therewith, the roots of the threads being parallel with the thread axis widthwise of said roots, the root of the bolt thread having a shallow longitudinal channel therein and the nut thread having a crest portion loosely engageable in said channel, the channel being sufficiently displaced from that side of the bolt thread which faces the bolt head to permit seating of the nut thread upon the root of the bolt thread between the channel and said side of the bolt thread.

3. A self-locking fastening device of the bolt and nut type, comprising a bolt having a head and an external screw thread of constant pitch, and a nut having an internal symmetrical screw thread of the same pitch as the bolt thread, the threads having roots materially wider than the thread bases to permit substantial crosswise displacement between the threads while interfitted and having complementary side faces engageable to limit the extent of such displacement, the roots of the threads being parallel with the threads axis widthwise of said roots and the bolt thread root having a shallow longitudinal channel lying along that side of the bolt thread facing the nut receiving end of the bolt in which the crest of the nut thread is receivable, the symmetrical nut thread having a crest exteriorly arched between the side faces of said thread and including a medial surface portion of appreciable width and of a constant diameter which is less than that of the bolt thread root, and the extent of crosswise displacement between the threads being such as to permit forcible telescoping of said medial surface portion of the nut thread crest upon the bolt thread root between the channel and that side of the bolt thread which faces the bolt head to frictionally lock the nut on the bolt.

4. A self-locking screw thread connection for two members provided respectively with an internal screw thread and an external screw thread for separably connecting the members, characterized in that the convolutions of said threads have space therebetween for substantial crosswise displacement between the threads while interfitted, the thread pitch being constant from end to end of the threads and being identical for both threads, the threads having complementary side faces extending abruptly to the thread axes in the direction of thread depth and engageable to positively limit the extent of crosswise displacement between the threads while the threads are interfitted, and the root of one thread having a shallow longitudinal channel therein and lying parallel with the thread axis from one edge of said channel to its junction with one side face of the thread, the channel having a side wall extending to said edge thereof at a much lower slope to the thread axis than the side faces of the threads, and the other thread being a symmetrical thread the crest of which is loosely receivable in said channel and of less diameter than said root and displaceable out of said channel upon an adjacent portion of said root at one limit of crosswise thread displacement.

5. A self-locking screw thread connection for two members having respectively an internal thread and an external thread for connecting the members, characterized in that the two threads are of the same pitch and have sufficient space between their convolutions to permit substantial crosswise displacement between the threads while interfitted, one thread being a symmetrical thread and the other thread having a root of less diameter along one side of said thread than along the other side, and the diameter of the symmetrical thread at its crest being such that the threads are freely relatively screwable at one limit of crosswise thread displacement and the crest of the symmetrical thread and root of the other thread are tightly jammed one on the other at the opposite limit of crosswise thread displacement.

6. A self-locking screw thread connection for a bolt and nut, wherein the bolt and nut threads are of equal pitch and capable of substantial crosswise displacement while interfitted, said threads having complementary side faces engageable to limit crosswise displacement between the threads in both directions while the threads are interfitted, the nut thread being a symmetrical thread having a crest slightly arched between its side faces, and the bolt thread having a root upon which the crest of the nut thread tightly binds when displaced fully toward the nut receiving end of the bolt, and about which the crest of the nut thread is freely turnable when the nut thread is fully displaced away from said end of the bolt.

7. A self-locking screw thread connection for two members provided respectively with an external and an internal connecting screw thread, in which the two threads are of equal pitch and each has a base of materially less width than the root of the thread, said threads having complementary side faces engageable to limit crosswise displacement between the threads in both directions, the internal thread having a symmetrical profile and a slightly arched crest, the threads being freely interfittable at one limit of said crosswise displacement and the diameter of the root of the external thread exceeding the minor diameter of the internal thread for a sufficient portion of the root width to permit tight frictional jamming thereon of the crest of the internal thread at the opposite limit of crosswise thread displacement.

8. A self-locking fastening device of the bolt and nut type, comprising a bolt having a head at one end and an external screw thread of constant pitch, and a nut having an internal screw thread of the same constant pitch as the bolt thread, the nut thread having a symmetrical profile, both threads having crests and roots connected by side faces all making an angle of the same amplitude with the thread axis which angle is of large amplitude, the crest of the nut thread being arched between the side faces of said thread, the convolutions of the threads having sufficient space therebetween to permit substantial crosswise displacement between the threads while interfitted, the root of the bolt thread having a sloping surface making an angle of relatively small amplitude with the thread axis as compared with the side faces of the threads and approaching the thread axis in the direction of the bolt head, said surface at its opposite edges having radial displacements from the bolt thread axis respectively less than and greater than the minor diameter of the nut thread, and the crosswise thread displacement being of sufficient extent to permit easy screwing of the nut on the bolt when the nut thread is fully displaced relatively to the bolt thread toward the bolt head and to permit the arched crest of the nut thread to ride up said sloping surface automatically as the nut is tightened against the work.

9. A self-locking fastening device as claimed in claim 8, wherein the said sloping surface is spaced from that side of the bolt thread which faces the bolt head and is connected with said side of the bolt thread by a root surface lying parallel with the thread axis from edge to edge thereof and of sufficient width to permit seating thereon of the medial portion of the arched crest of the nut thread when the latter thread is displaced into side engagement with said side of the bolt thread.

In testimony whereof I hereunto affix my signature.

L. B. BRIDGES.